United States Patent [19]
Emerson

[11] 3,729,925
[45] May 1, 1973

[54] DRIVE ARRANGEMENT FOR TIMEKEEPING SYSTEM

[75] Inventor: Frank W. Emerson, Peterborough, Ontario, Canada

[73] Assignee: General Time Corporation, Thomaston, Conn.

[22] Filed: Aug. 26, 1970

[21] Appl. No.: 67,215

Related U.S. Application Data

[62] Division of Ser. No. 830,063, June 3, 1969, Pat. No. 3,545,655.

[52] U.S. Cl. ............... 58/23 D, 58/23 BA, 310/5, 318/116
[51] Int. Cl. ............... G04c 3/00, H02n 1/00
[58] Field of Search ........... 58/23 R, 23 BA, 23 D; 310/5, 6; 318/116

[56] References Cited

UNITED STATES PATENTS

| | | | |
|---|---|---|---|
| 3,400,282 | 9/1968 | Felici | 310/6 |
| 3,527,992 | 9/1970 | Bright et al. | 318/116 |

Primary Examiner—Richard B. Wilkinson
Assistant Examiner—Edith C. Simmons Jackmon
Attorney—Pennie, Edmonds, Morton, Taylor and Adams

[57] ABSTRACT

A drive arrangement for a timekeeping system comprising an electrostatic motor including a rotor having a dielectric surface and a pair of electrodes operatively associated with the rotor for driving the rotor in response to a d-c potential applied across the electrodes. In one embodiment, one of the electrodes is mounted on one of the tines of a tuning fork, and the dielectric rotor surface is serrated for impulsing the tuning fork to vibrate the same while synchronizing the speed of the rotor with the natural frequency of the tuning fork. In another embodiment, both electrodes are mounted on the two tines of a tuning fork, and the serrated rotor is mounted between the electrodes for impulsing both tines of the tuning fork. In a further embodiment, a rotor having a dielectric surface is associated with two pairs of electrodes, each pair being associated with a different circumferential band of the dielectric surface, with one of the electrodes in the first pair connected to one terminal of the d-c voltage source, one electrode in the second pair being connected to the other terminal, and the other two electrodes being interconnected to form a voltage divider across the voltage source. In still another embodiment, the rotor is provided with a discontinuous dielectric surface, and the electrodes are connected to an a-c power source, with a source of ionizing radiation being associated with each electrode for ionizing the gas in the space between each electrode and the dielectric surface to increase the driving force applied to the rotor surface.

2 Claims, 6 Drawing Figures

Patented May 1, 1973 3,729,925
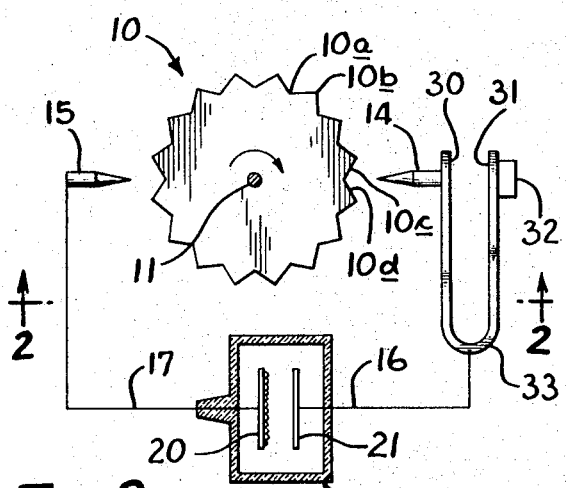
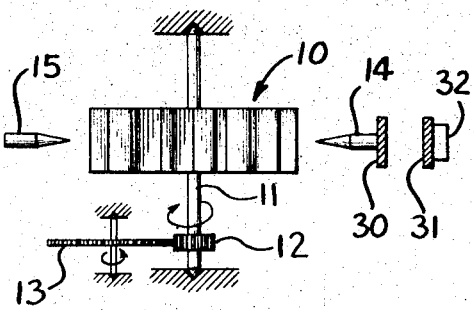
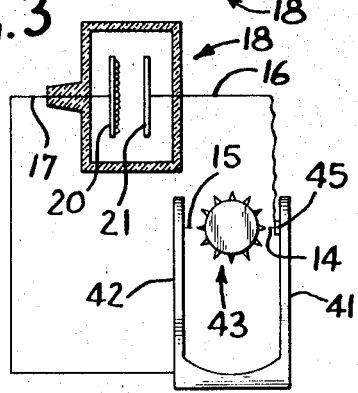
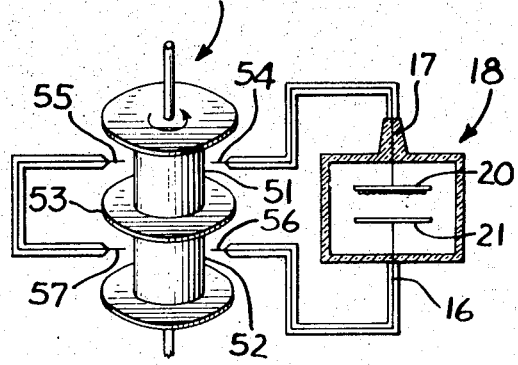
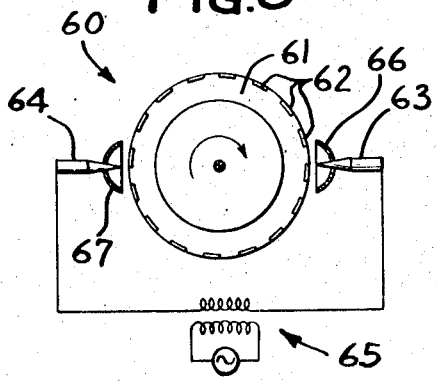
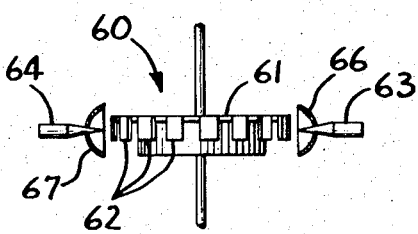
INVENTOR
FRANK W. EMERSON
by: Wolfe, Hubbard, Voit & Osann
ATTYS.

3,729,925

DRIVE ARRANGEMENT FOR TIMEKEEPING SYSTEM

This application is a divisional of my copending application Ser. No. 830,063, filed June 3, 1969 now U.S. Pat. No. 3,545,655.

DESCRIPTION OF THE INVENTION

The present invention relates generally to timekeeping systems and, more particularly, to an improved drive arrangement for timekeeping systems.

It is a primary object of the present invention to provide an improved drive arrangement for a timekeeping system which can be operated for a number of years with a single self-contained power source. A related object of the invention is to provide such a drive arrangement which serves as a timekeeping standard as well as a source of driving power for a time indicating mechanism.

It is another object of the invention to provide an improved drive arrangement of the type described above which can be made with only a single moving part.

A further object of the invention is to provide an improved drive arrangement of the foregoing type which produce an output suitable for application to conventional mechanical timing trains for driving conventional indicating elements.

Yet another object of the invention is to provide such an improved drive arrangement which can be powered by a high voltage, low current power source.

A specific object of one particular aspect of the invention is to provide an improved synchronous drive system of the foregoing type which produces rotary motion from an a-c power source.

A still further object of the invention is to provide such an improved drive arrangement which can be efficiently manufactured at a low cost.

Other objects and advantages of the invention will be apparent from the following detailed description taken in connection with the accompanying drawings, in which:

FIG. 1 is a partially schematically side elevation of a drive arrangement embodying the invention, with the power source shown in section;

FIG. 2 is a section taken along line 2—2 in FIG. 1;

FIG. 3 is a partially schematic side elevation of a modified drive arrangement embodying the invention, with the power source shown in section;

FIG. 4 is a partially schematic perspective of another modified drive arrangement embodying the invention, with the power source shown in a sectional elevation;

FIG. 5 is a partially schematic top plan view of a further modified drive arrangement embodying the invention, with the shrouding plates on the tips of the electrodes shown in section; and FIG. 6 is a side elevation of the arrangement shown in FIG. 5, with the shrouding plates on the tips of the electrodes shown in section.

While the invention is susceptible of various modifications and alternative forms, certain specific embodiments thereof have been shown by way of example in the drawings which will be described in detail herein. It should be understood, however, that it is not intended to limit the invention to the particular forms disclosed but, on the contrary, the intention is to cover all modifications, equivalents, and alternatives falling within the spirit and scope of the invention.

Turning now to the drawings, there is shown a rotor 10 fixed to a shaft 11 which also carries a pinion 12 to be rotated in response to rotation of the rotor 10. As the pinion 12 is rotated, it drives a gear 13 connected to a conventional timekeeping and indicating mechanism. That is, the pinion 12 and the gear 13 serve to apply the torque generated by the rotor 10 to a conventional timekeeping and indicating mechanism.

At least the surface of the rotor 10 is made of a dielectric material operatively associated with a pair of circumferentially spaced electrodes, and a beta current nuclear battery is connected to the electrodes for applying a d-c potential across the electrodes to drive the rotor. The rotor 10 is molded from a dielectric material, i.e., a material which will support an electric charge without conducting current. A pair of tapered electrodes 14 and 15 are mounted close to the outer circumferential surface 10a of the dielectric rotor 10, and are connected to the positive and negative terminals 17 and 16, respectively, of a source 18 of relatively high d-c voltage. When this voltage is applied across the two electrodes, a charge having a polarity opposite that of the electrode 15 accumulates on the surface of the rotor 10 in the vicinity of the electrode 14. While it is not intended to limit the present invention to any particular theory, whether it be charge collection or "ion wind" with respect to the charge carrier, it is believed that the relatively high voltage applied to the electrodes 14 and 15 causes gas atoms in the vicinity of the electrodes 14 and 15 to be ionized by the release of electrons therefrom, thereby producing gas ions in the space adjacent the electrodes 14 and 15. Since the adjacent surface 10a of the rotor 10 is a dielectric, the gas ions are collected and retained on the rotor surface 10a rather than being dissipated.

Electrode 15 has a polarity opposite that of the charges accumulated on the rotor surface 10a, and electrode 14 has a polarity opposite that of the charges accumulated on the rotor surface 10a. Since these charges exist in an electric field between the electrodes 14 and 15, the charges are attracted to the electrodes of opposite polarity. Because the charges cling to the surface of the rotor 10a, rotational motion is imparted to rotor 10. Thus, as the rotor 10 rotates it is believed that positive gas ions originating at the electrode 15 cling to rotor surface 10a and are transported to the electrode 14, where the charge is lost. It is also believed that as the rotor 10 rotates negative gas ions originating at the electrode 14 cling to the rotor surface 10a and are transported on the opposite side of the rotor from the positive ions to the electrode 15, where the charge is lost. This "ion wind" theory has two possible explanations. First when the gas ions travel in the space between the electrodes 14 and 15 and the rotor surface 10a they give up the kinetic energy to rotor 10 thereby increasing the torque applied to the rotor 10. The second theory is that the free charges or gas ions may not cling tenaciously to the rotor surface 10a and thereby produce torque while sliding over the surface. This "ion wind," whether produced in accordance with either of the two theories or a combination of the two, contributes only partially to the total torque.

Regardless of whether the particular theories on charge collection or ion wind are precisely accurate explanations of the observed phenomenon, it has been repeatedly demonstrated that the dielectric rotor 10 does, in fact, rotate in the direction indicated when a relatively high d-c potential (on the order of 6000 volts, for example) is applied across a pair of electrodes located close to the rotor surface and circumferentially spaced therealong. Moreover, it has been found that such a system is capable of generating a torque sufficient to drive a conventional mechanical timekeeping and indicating system when the electrodes are connected to currently available d-c voltage sources. Specific working examples of such a drive system will be described in more detail below. It should be noted that the magnitude of output torque generated by any particular system embodying this invention is dependent upon a number of interdependent variables, such as the size of the rotor, the electrode spacing both with respect to each other and the dielectric rotor surface, the magnitude of the potential applied across the electrodes, the particular ionizable gas surrounding the electrodes and the dielectric rotor surface, the electrode material the electrode shapes, the dielectric material, the pressure of the ionizable gas, the temperature of the electrodes and the surrounding gas, and the like.

The source of the d-c potential applied across the electrodes 14 and 15 is a beta current nuclear battery comprising a casing 19 forming a vacuum chamber containing an internal emitter 20 and an internal collector 21. The surface of the emitter 20 facing the collector 21 is coated with a radioactive material so as to generate a d-c potential across the two external terminals 16 and 17 connected to the collector 21 and the emitter 20, respectively. Constant beta nuclear batteries of the type illustrated are well known per se, and thus the illustrative source 18 will not be described in detail herein. Briefly summarized, the radioactive material on the emitter 20 emits radiation such as beta particles which are collected on the collector 21, leaving the anode plate with a positive charge relative to the anode 21. Since the beta particles expend kinetic energy against the electrostatic field which exists between the collector and emitter, potential energy on the order of several thousand volts is developed at the external terminals. Although beta current nuclear batteries of this type have been known per se, the relatively low power available from such sources has tended to limit the practical application thereof. One of the significant advantages of the present invention is that the electrostatic motor utilizes the high voltage, low current output from the nuclear battery to provide an output torque suitable for driving a conventional mechanical timekeeping and indicating mechanism.

In accordance with the present invention, at least one of the electrodes associated with the dielectric rotor surface is mounted on one of the tines of a tuning fork, and the dielectric rotor surface is serrated for impulsing the tuning fork to vibrate the tines thereof in response to rotation of the rotor. This vibratory motion of the tuning fork tines in turn cooperates with the dielectric serrated rotor surface to stabilize the speed of the rotor at a speed proportional to the frequency of the vibratory motion; since an inherent characteristic of tuning forks is a constant frequency of vibration, the synchronization of the rotary motion of the rotor with the vibratory motion of the tuning fork results in a substantially constant rotor speed. Thus, in the illustrative embodiment shown in FIG. 1, the electrode 14 is mounted on one tine 30 of a tuning fork 31. To balance the tuning fork, a counterweight 32 is mounted on the other tuning fork tine 33. For the purpose of applying driving impulses to the tuning fork 31 in response to rotation of the rotor 10, and to synchronize the rotary motion of the rotor 10 with the constant-frequency vibratory motion of the tuning fork 31, the circumferential dielectric surface 10a of the rotor 10 is serrated, as shown most clearly in FIG. 1. As the rotor 10 is rotated, the charge collected on the serrated surface 10a produces a variable attractive force on the electrode 14, and thus the tine 30 on which the electrode is mounted, hereby vibrating the tuning fork at its natural frequency of vibration.

Although the driving impulses are applied to only one of the tuning fork tines in the embodiment of FIGS. 1 and 2, it will be appreciated by those familiar with this art that the application of such impulses results in vibration of both tines of the tuning fork. Since the tuning fork 31 inherently vibrates at its natural frequency, the electrode 14 is repetitively advanced and retracted relative to the serrated surface of the rotor 10 at the natural frequency of the tuning fork. This vibratory movement of the electrode tends to synchronize the movement of the serrated surface of the rotor with the natural frequency of the tuning fork. More particularly, the vibratory motion of the electrode 14 on the tuning fork tends to control the rotor speed so that the electrode reaches its most retracted position when it is directly aligned with one of the depressed areas 10a in the dielectric rotor surface and so that the electrode 14 reaches its most advanced position when it is directly aligned with one of the peaks 10b on the dielectric surface.

If the rotor moves at a speed which is out of synchronism with the vibratory movement of the electrode 14, the electrode 14 will reach its most advanced position when aligned with an inclined portion of the dielectric surface somewhere between a depression 10a and a peak 10b. More specifically, if the rotor accelerates relative to the vibratory motion of the tuning fork, the electrode 14 will reach its most advanced position when aligned with one of the forwardly facing inclined surfaces 10c, so that the attracting force exerted by the electrode 14 on the serrated dielectric surface has a braking effect on the rotor so as to restore the rotor to synchronization with the vibratory movement of the fork. On the other hand, if the rotor decelerates relative to the vibratory motion of the tuning fork, the electrode 14 will reach its most advanced position when aligned with one of the rearwardly facing inclined surfaces 10d, so that the attracting force exerted by the electrode 14 on the serrated dielectric surface has an accelerating effect on the rotor, to restore synchronization between the rotary movement of the rotor and the vibratory movement of the tuning fork.

In accordance with one specific embodiment of the invention, each of the two electrodes associated with the dielectric rotor surface is mounted on the inside surface of a different one of the tuning fork tines, and the rotor is mounted between the tines so that the serrated surface of the rotor cooperates with both of the electrodes, thereby impulsing both of the tines in synchronism with each other. Thus, in the illustrative embodiment shown in FIG. 3, a relatively wide tuning fork 40 carries the two electrodes 14 and 15 on the inside surfaces of the two tines 41 and 42, respectively. The electrodes are connected to the d-c potential source 18 via the conductive metal of the tine, and a conductor from battery terminal 16 to electrode 14. Electrode 14 is insulated from the tine 41 by an insulator 45. A rotor 43 is mounted directly between the two electrodes 14 and 15 for rotation by the phenomena described heretofore, with the two tines 41 and 42 being impulsed by the alternating forces exerted on the electrodes by the charge on the serrated surface of a rotor 43. The rotor 43 is similar to the rotor 10 described previously in connection with FIGS. 1 and 2, except that it is made smaller in order to fit between the tines of the tuning fork 40. The theory of operation is also the same as described in connection with FIGS. 1 and 2, except that the second electrode 15 is added and vibrates in the same manner as electrode 14 through the variable attraction to rotor 43. Consequently, if the synchronism between the rotary movement of the rotor 43 and the vibratory movement of the tuning fork 40 is disturbed, the electrodes 14 and 15 accelerate the rotor by the repelling forces exerted on the rearwardly facing inclined surfaces 10c, and decelerate the rotor by the attracting forces exerted on the rearwardly facing inclined surfaces 10c. Thus, the electrodes 14, 15 are positioned so that the electrodes 14 and 15 normally reach their most retracted position when aligned with depressions 10a, and their most advanced position when aligned with a peak 10b, when the rotor and the tuning fork are in synchronism with each other.

In accordance with another aspect of the present invention, two different pairs of electrodes are operatively associated with two different circumferential bands of the dielectric rotor surface, with one electrode of the first pair being connected to the positive terminal of the d-c potential source, one of the electrodes of the second pair being connected to the negative terminal of the d-c potential source, and the other two electrodes being interconnected. Thus, in the illustrative embodiment of this particular species of the invention shown in FIG. 4, a rotor 50 forms two circumferential dielectric surfaces 51 and 52 along the axis thereof. Each of the dielectric surfaces 51 and 52 extends continuously around the outer surface of the rotor 50, in the circumferential direction, with the two surfaces 51 and 52 being separated by an annular insulating flange 53. Associated with the two dielectric surfaces 51 and 52 are two pairs of electrodes 54, 55 and 56, 57, respectively. The d-c potential generated by the high voltage, low current source 18 is applied across the two electrodes 54 and 56, and the other two electrodes 55 and 57 are interconnected so as to form a voltage divider connected across the terminals of the source 18. Consequently, half of the potential generated by the source 18 is applied across the first pair of electrodes 54 and 55, associated with the dielectric surface 51, and the other half of the potential generated by the source 18 is applied across the second pair of electrodes 57 and 56, associated with the second dielectric surface 52.

The two pairs of electrodes 54, 55 and 56, 57 are oriented relative to the dielectric surfaces 51 and 52 in such a manner that both pairs of electrodes drive the rotor 50 in the same direction. This arrangement has the advantage of providing more efficient utilization of relatively high d-c potentials, such as are generated by beta current nuclear batteries for example. Thus, if the nuclear battery 18 generates a d-c potential of 12,000 volts, for example, 6,000 volts may be applied across the electrodes 54 and 55 to apply a first driving force to the rotor on the dielectric surface 51, and another 6,000 volts may be applied across the electrodes 57 and 56 to apply a second driving force to the dielectric surface 52.

In accordance with a further aspect of the invention, there is provided a synchronous drive system for producing rotary motion from an a-c power source. More particularly, a rotor having a dielectric surface that is discontinuous around the circumference of the rotor is disposed in an ionizable gas, and a pair of electrodes connected to the a-c power source are operatively associated with the discontinuous dielectric surface for driving the rotor in response to the a-c voltage generated by the source. Since the potentials available from a-c power sources are typically lower than the potentials available from d-c power sources such as beta current nuclear batteries, the driving force applied to the rotor with the discontinuous dielectric surface is increased by providing sources of ionizing radiation associated with the two electrodes for ionizing the air or other gas in the space between each electrode and the dielectric rotor surface. Thus, in the illustrative embodiment illustrated in FIGS. 5 and 6, a rotor 60 includes a central disc 61 carrying a plurality of equally spaced, axially extending flange segments 62 made of a dielectric material. Mounted on diametrically opposite sides of the rotor 60 are electrodes 63 and 64 connected to a conventional a-c power source 65. During alternate half cycles of the a-c signal from the source 65, a charge of a predetermined polarity is collected on the dielectric segments 62 as they move successively past the tips of the electrodes 63 and 64. During intervening half cycles of the a-c signal from the source 65, the spaces between the dielectric segment 62 are aligned with the tips of the electrodes 63 and 64, so that charges of a polarity opposite that of the charges accumulated on the segments 62 are dissipated. Consequently, it can be seen that the driving forces applied to the rotor 60 are of a pulsating nature, and are synchronized with the frequency of the a-c signal from the source 65, thereby providing a synchronous drive system.

In keeping with the invention, the tips of electrodes 63 and 64 are shrouded with hemispherical plates 66 and 67, respectively, which are lined on their inner surfaces with layers of radioactive material for emitting alpha particles in the spaces between the electrodes and the rotor surface. The alpha particles make the gas more conductive by filling the intervening spaces between the electrodes 66 and 67 with positive gas ions and electrons. The positive ions and electrons thereby produced travel to the electrodes of the opposite polarity. Consequently, the rotor 60 is driven at a speed sufficient to drive a timekeeping system, even though the input voltage supplied by the a-c power source 65 is relatively low.

I claim as my invention:

1. An improved drive arrangement for a timekeeping system comprising the combination of a rotor having a dielectric surface, first and second electrodes operatively associated with a first portion of said dielectric surface for driving said rotor in a predetermined direction in response to a d-c potential applied across said first and second electrodes, third and fourth electrodes operatively associated with a second portion of said dielectric surface for driving said rotor in said predetermined direction in response to a d-c potential applied across said third and fourth electrodes, a source of d-c potential having a positive terminal connected to said first electrode and a negative terminal connected to said fourth electrode, said second and third electrodes being electrically connected so that said first and second electrodes and said third and fourth electrodes form a voltage divider across said source of d-c potential.

2. An improved drive arrangement as set forth in claim 1 which includes a constant current nuclear battery connected to said electrodes for applying a d-c potential across said electrodes to drive said motor.

* * * * *